(12) United States Patent
Ikai et al.

(10) Patent No.: US 10,564,620 B2
(45) Date of Patent: Feb. 18, 2020

(54) SERVO MOTOR CONTROL APPARATUS FOR CONTROLLING SERVO MOTOR AND SERVO MOTOR CONTROL SYSTEM INCLUDING THE SAME

(71) Applicant: FANUC CORPORATION, Yamanashi (JP)

(72) Inventors: Satoshi Ikai, Yamanashi (JP); Tomoyuki Aizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/919,853

(22) Filed: Mar. 13, 2018

(65) Prior Publication Data

US 2018/0267502 A1    Sep. 20, 2018

(30) Foreign Application Priority Data

Mar. 14, 2017    (JP) .................. 2017-048997

(51) Int. Cl.
*G05B 19/404* (2006.01)

(52) U.S. Cl.
CPC .. *G05B 19/404* (2013.01); *G05B 2219/35373* (2013.01); *G05B 2219/41138* (2013.01)

(58) Field of Classification Search
CPC .......... H02P 29/032; H02P 29/02; H02P 6/12; H02P 21/26; H02P 21/18; H02P 2207/05; H02P 6/08
See application file for complete search history.

(56) References Cited

U.S. PATENT DOCUMENTS

| | | | |
|---|---|---|---|
| 8,633,663 B2 * | 1/2014 | Sonoda | H02P 29/032 318/400.15 |
| 2007/0145926 A1 * | 6/2007 | Egami | B60K 6/26 318/432 |
| 2010/0139333 A1 * | 6/2010 | Maekawa | D06F 37/304 68/212 |

FOREIGN PATENT DOCUMENTS

| | | |
|---|---|---|
| CN | 102868358 A | 1/2013 |
| CN | 102904498 A | 1/2013 |
| DE | 102009058443 A1 | 11/2010 |
| DE | 102012106771 A1 | 1/2013 |
| JP | H6-225572 A | 8/1994 |
| JP | H11-191990 A | 7/1999 |
| JP | 2017-017931 A | 1/2017 |
| WO | 2016/121373 A1 | 8/2016 |

* cited by examiner

*Primary Examiner* — Rina I Duda
(74) *Attorney, Agent, or Firm* — Hauptman Ham, LLP

(57) ABSTRACT

A servo motor control apparatus for controlling a servo motor includes a storage unit configured to store a torque constant predefined for the servo motor, a torque constant correction unit configured to correct the torque constant stored in the storage unit when magnetic saturation occurs in a winding of the servo motor, and an output calculation unit configured to calculate an output of the servo motor on the basis of the torque constant stored in the storage unit or the torque constant after correction calculated by the torque constant correction unit, a value associated with a current of the servo motor, and a value associated with a speed of the servo motor.

12 Claims, 8 Drawing Sheets

SERVO MOTOR CONTROL APPARATUS FOR CONTROLLING SERVO MOTOR AND SERVO MOTOR CONTROL SYSTEM INCLUDING THE SAME

RELATED APPLICATIONS

The present application claims priority to Japanese Patent Application No. 2017-048997 filed on Mar. 14, 2017, the disclosure of which is hereby incorporated by reference herein in its entirety.

BACKGROUND OF THE INVENTION

1. Field of the Invention

The present invention relates to a servo motor control apparatus for controlling a servo motor and a servo motor control system including the same.

2. Description of the Related Art

In a servo motor control apparatus for driving and controlling a servo motor in a machine tool or industrial machinery such as forming machinery, a molding machine, or a robot, AC power of an AC power supply is converted temporarily into DC power, the DC power is further converted into AC power, and the AC power is used as drive power for the servo motor provided for each drive axis. The servo motor control apparatus includes a rectifier that converts AC power supplied from the AC power supply into DC power and outputs the DC power and an inverter that is connected to a DC link on the DC side of the rectifier and performs power conversion between DC power in the DC link and AC power serving as drive power or regenerative power of the motor, and the servo motor control apparatus controls the speed, torque, or rotor position of the servo motor connected to the AC output side of the inverter.

Since the motor consumes high power upon acceleration, high AC power may be preferably output by a power supply equipment on the AC power supply side. Therefore, the power supply equipment on the AC power supply side is preferably capable of outputting a peak of AC power required for output. For this reason, to avoid a situation in which the capacity of the power supply equipment on the AC power supply side is insufficient for the power peak, the motor is preferably operated under a lower operation condition to reduce power consumption of the motor, or the power supply equipment is preferably designed with a margin for the power peak. However, operating the motor under the lower operation condition is inefficient and is not preferable because designing the power supply equipment with such a margin leads to higher cost and larger installation space.

Thus, as disclosed in Japanese Unexamined Patent Publication (Kokai) No. 2017-017931, for example, there has been employed a technique in which the power peak for the power supply equipment on the AC power supply side is reduced by providing an electricity storage device in a DC link connecting a rectifier and an inverter. In the technique, power is supplied from or stored in the electricity storage device via the DC link in accordance with power consumption and power regeneration of the servo motor to reduce the power peak for the power supply equipment on the AC power supply side.

For example, average power consumption of a press machine driven by a servo motor is lower than that of a press machine using hydraulic pressure as the drive source although maximum power consumption consumed at performing a press operation is significantly high, and it may lead to a problem in which the capacity of the power supply equipment on the AC power supply side is insufficient. In the servo motor control apparatus of such a press machine, the power peak for the power supply equipment on the AC power supply side may be reduced by providing an electricity storage device for supply and storage of power, calculating power consumed at operating the press machine, and as a result of calculation, supplying power from the electricity storage device when the press machine consumes power or causing the electricity storage device to consume power when the press machine regenerates power.

SUMMARY OF INVENTION

As current flowing through a winding constituting a servo motor is higher, magnetic flux generated in the winding increases. The maximum density of the magnetic flux (maximum magnetic flux density) generated is determined in accordance with a material of a core for the winding, a shape of the winding, and the number of turns, and when the density of the magnetic flux exceeds the maximum value, the winding enters a magnetic saturation state. The relation between the current flowing through the winding of the servo motor and the generated torque is linear in a state in which magnetic saturation does not occur, and the torque linearly increases when the current flowing through the winding of the servo motor is increased. However, when the current is further increased and magnetic saturation occurs, the generated torque does not linearly increase and a torque constant, which is a torque increase rate, gradually decreases. The torque is determined on the basis of the torque constant and the current flowing through the winding while an output of the servo motor is determined on the basis of the rotation speed and torque of the servo motor. Since the torque does not linearly increase and the torque constant is decreased when the winding is in a magnetic saturation state, the actual output of the servo motor is smaller as compared with a case in which the output is calculated with ignoring a decrease of the torque constant (i.e., without considering magnetic saturation). In other words, calculation of the output of the servo motor with ignoring a decrease of the torque constant due to magnetic saturation lacks accuracy.

For example, in a servo motor control apparatus for controlling a drive axis servo motor that drives an axis of industrial machinery or a machine tool, an electricity storage device for reducing a power peak for a power supply equipment on the AC power supply side may be configured with a flywheel and a flywheel servo motor that drives the flywheel. In accordance with a power state of the drive axis servo motor, electric power supplied from or consumed (accumulated) by the electricity storage device is determined by the output of the flywheel servo motor in the electricity storage device. Therefore, to control the output of the flywheel servo motor, the output of the flywheel servo motor is preferably calculated with accuracy.

As described above, in a field in which a servo motor is used, an output of the servo motor is preferably calculated with high degree of precision.

One aspect of the present disclosure is a servo motor control apparatus for controlling a servo motor, which includes a storage unit configured to store a torque constant predefined for the servo motor, a torque constant correction unit configured to correct the torque constant stored in the storage unit when magnetic saturation occurs in a winding of the servo motor, and an output calculation unit configured to calculate an output of the servo motor on the basis of the torque constant stored in the storage unit or the torque constant after correction calculated by the torque constant correction unit, a value associated with a current of the servo motor, and a value associated with a speed of the servo motor.

BRIEF DESCRIPTION OF THE DRAWINGS

The present invention will be more clearly understood with reference to the following accompanying drawings.

DETAILED DESCRIPTION

Figure 1:
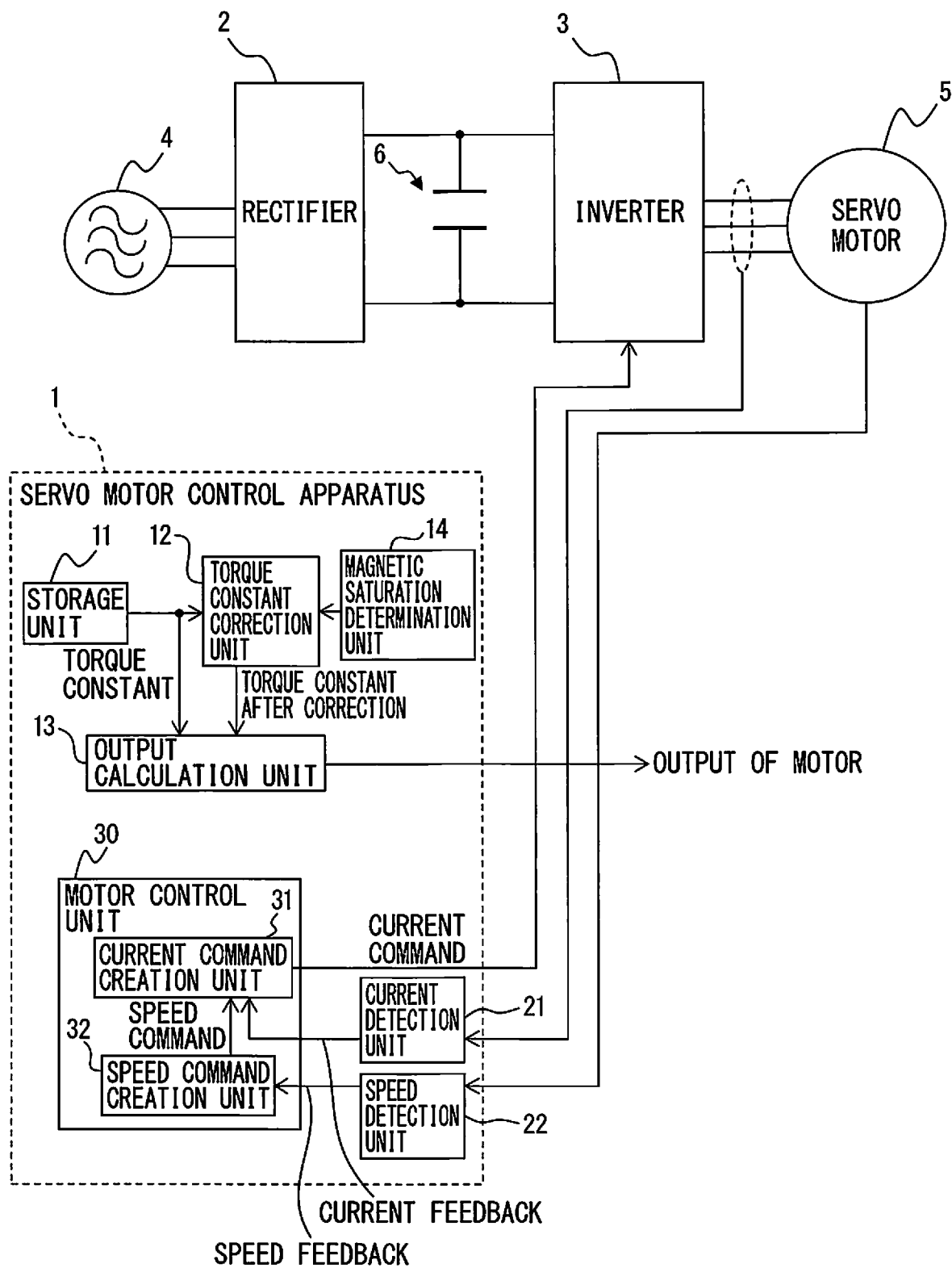
FIG. 1 is a block diagram of a servo motor control apparatus according to one embodiment.

A servo motor control apparatus for controlling a servo motor and a servo motor control system including the same will be described below with reference to the drawings. In each drawing, similar members are denoted by similar reference numerals. The same reference numerals in different drawings denote components having the same functions. To facilitate understanding, these drawings use different scales as appropriate.

FIG. 1 is a block diagram of a servo motor control apparatus according to one embodiment. As an example, a case in which a servo motor 5 is controlled by a servo motor control apparatus 1 will be described here. In embodiments described below, an AC power supply 4 has three phases and the servo motor 5 has three phases although the number of phases does not particularly limit the present embodiment, and the number of phases may be a single phase. A type of the servo motor 5 controlled by the servo motor control apparatus 1 does not particularly limit the present embodiment and may be, for example, an induction motor or a synchronous motor.

Before describing the servo motor control apparatus 1 according to one embodiment, a main circuit system for supplying drive power to the servo motor 5 will be described as follows. AC power for driving the servo motor 5 is supplied by an inverter 3. The inverter 3 is connected to a DC link on the DC input side and performs power conversion between DC power in the DC link and AC power serving as drive power or regenerative power of the servo motor 5, controlled by the servo motor control apparatus 1. The DC link connecting the DC output side of a rectifier 2 and the DC input side of the inverter 3 is provided with a DC link capacitor (also referred to as a smoothing capacitor) 6. The DC link capacitor 6 has a function of accumulating DC power in the DC link as well as a function of suppressing a pulsating component of a DC output of the rectifier 2. The rectifier 2 converts AC power of the AC power supply 4 into DC power and outputs the DC power to the DC link on the DC output side.

Next, a control system including the servo motor control apparatus 1 according to one embodiment will be described.

Similarly to a general servo motor control apparatus, the servo motor control apparatus 1 includes a motor control unit 30, a current detection unit 21, and a speed detection unit 22, and controls the inverter 3 that performs power conversion between the DC power in the DC link and the AC power serving as drive power or regenerative power of the servo motor 5. The motor control unit 30 includes a current command creation unit 31 and a speed command creation unit 32. The speed command creation unit 32 creates a speed command for the servo motor 5 on the basis of (rotor) speed of the servo motor 5 detected by the speed detection unit 22 (speed feedback) and an operation program of the servo motor 5 and the like. The current command creation unit 31 creates a current command for controlling the speed, torque, or rotor position of the servo motor 5 on the basis of the current flowing through the winding of the servo motor 5 detected by the current detection unit 21 (current feedback) and a speed command input from the speed command creation unit 32. On the basis of the current command created by the motor control unit 30 (in other words, on the basis of a switching command created in response to the current command), power conversion by the inverter 3 is controlled. The configuration of the motor control unit 30 defined here is merely an example and the configuration of the motor control unit 30 including terms such as a position command creation unit, a torque command creation unit, and a switching command creation unit may be defined.

The servo motor control apparatus 1 according to one embodiment includes a storage unit 11, a torque constant correction unit 12, an output calculation unit 13, and a magnetic saturation determination unit 14.

In the storage unit 11, a torque constant predefined for the servo motor 5 is stored. The torque constant is commonly specified as a specification of the servo motor 5 and described in, for example, a specification table or an instruction manual of the servo motor 5. A method of writing the torque constant into the storage unit 11 itself does not limit the present embodiment, and the method of writing the torque constant into the storage unit 11 has been available, for example, through an input operation by an operator by way of a numerical control apparatus (not illustrated) connected to the servo motor control apparatus 1. The storage unit 11 may be configured using a non-volatile memory that can be electrically erased and recorded such as EEPROM (a registered trademark) or a random access memory that can be read and written at high speed such as DRAM or SRAM. The storage unit 11 may also store motor-specific information related to the servo motor 5 other than the torque constant. The motor-specific information related to the servo motor 5 includes, for example, information for specifying the servo motor 5 such as a type, specifications, a revision number, a lot number, or a serial number of the servo motor 5; a call number for a motor control parameter; a back EMF constant, inductance and resistance of the servo motor 5.

The magnetic saturation determination unit 14 determines whether magnetic saturation has occurred in the winding of the servo motor 5. More specifically, the magnetic saturation determination unit 14 determines that magnetic saturation has occurred in the winding of the servo motor 5 when a value associated with the current of the servo motor 5 exceeds a predetermined current threshold. In general, magnetic saturation occurs when a current flowing through the winding of the servo motor 5 exceeds a rated current; therefore, in one embodiment, a current threshold for determining magnetic saturation in the magnetic saturation determination unit 14 is set to a value corresponding to the rated current of the servo motor 5. Alternatively, the current threshold may be set to a value corresponding to a value close to the rated current of the servo motor 5. "A value associated with the current of the servo motor 5" is either a value of the current flowing through the winding of the servo motor 5 detected by the current detection unit 21 or a current command created by the current command creation unit 31. Therefore, "a value corresponding to the rated current of the servo motor 5" is specified by either the value of the rated current of the servo motor 5 or the current command corresponding to the rated current.

The torque constant correction unit 12 corrects the torque constant stored in the storage unit 11 when magnetic saturation has occurred in the winding of the servo motor 5, i.e., when the magnetic saturation determination unit 14 determines that magnetic saturation has occurred in the winding of the servo motor. The torque constant after correction when magnetic saturation has occurred in the winding of the servo motor 5 is sent to the output calculation unit 13 to be described later, and used for calculation of an output of the servo motor 5. On the other hand, when the magnetic saturation determination unit 14 does not determine that magnetic saturation has occurred in the winding of the servo motor, the torque constant stored in the storage unit 11 is not corrected and used for calculation of the output of the servo motor 5 by the output calculation unit 13 as it is. In one embodiment, the torque constant correction unit 12 corrects the torque constant stored in the storage unit 11 when magnetic saturation has occurred in the winding of the servo motor 5 such that the torque constant decreases as the value associated with the current of the servo motor increases. In this case, the torque constant after correction calculated by the torque constant correction unit 12 is expressed by a linear function in which, for example, the value associated with the current of the servo motor 5 is an independent variable and the torque constant decreases as the value associated with the current of the servo motor increases. The operation described above will be described in more detail with reference to FIG. 2A and FIG. 2B.

Figure 2A:
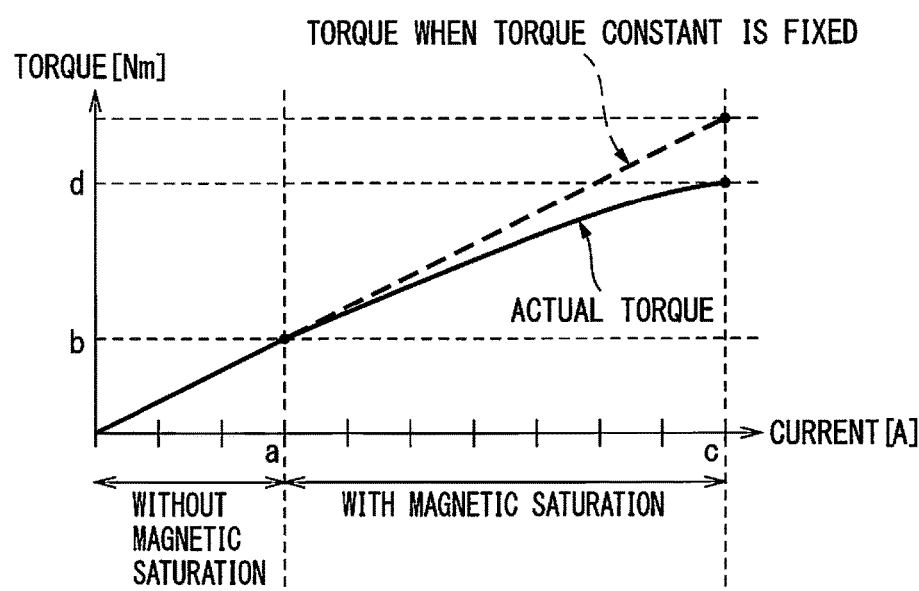
FIG. 2A is a diagram for describing correction of a torque constant by a torque constant correction unit, and schematically illustrates a relation between a current flowing through a winding of a servo motor and torque generated in the servo motor.
Figure 2B:
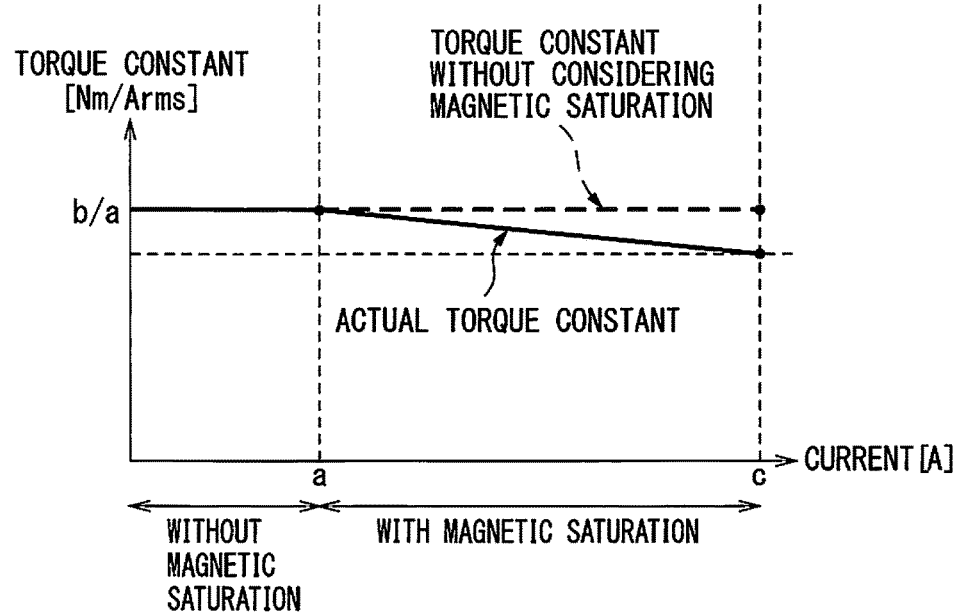
FIG. 2B is a diagram for describing correction of a torque constant by a torque constant correction unit, and schematically illustrates a relation between the current flowing through the winding of the servo motor and the torque constant of the servo motor.

FIG. 2A is a diagram for describing correction of a torque constant by a torque constant correction unit, and schematically illustrates a relation between a current flowing through a winding of a servo motor and torque generated in the servo motor. FIG. 2B is a diagram for describing correction of the torque constant by the torque constant correction unit, and schematically illustrates a relation between the current flowing through the winding of the servo motor and the torque constant of the servo motor. In FIG. 2A, a thick solid line indicates actual measured torque while a thick dashed line indicates torque obtained by calculation with fixing the torque constant without considering magnetic saturation. In FIG. 2B, a thick solid line indicates actual torque while a thick dashed line indicates the torque constant without considering magnetic saturation.

The inventor of the present invention has observed a relation between a current flowing through the winding of the servo motor 5 and the generated torque in experiment to find out that, in a range where the current flowing through the winding of the servo motor 5 exceeds a rated current, the torque can be approximated by a quadratic function in which the current is an independent variable. As illustrated in FIG. 2A, in a range without magnetic saturation, as the current flowing through the winding of the servo motor 5 is higher, magnetic flux generated in the winding increases and the torque linearly increases. When the current flowing through the winding of the servo motor 5 is further increased and exceeds a rated current $I_1$, magnetic saturation occurs. In a range with magnetic saturation, the generated torque deviates from a linear increase and the increase tendency (an increase rate) is slower as compared with the torque obtained by calculation with fixing the torque constant without considering magnetic saturation. Torque is calculated on the basis of the torque constant and the current flowing through the winding, and the slow increase tendency of the torque deviating from a linear increase indicates a decrease of the torque constant. In other words, in a range without magnetic saturation where the current flowing through the winding of the servo motor 5 is zero to the rated current $I_1$, the torque linearly increases, and the torque reaches the rated torque $T_1$ when the current flowing through the servo motor 5 is the rated current $I_1$. In a range with magnetic saturation where the current flowing through the winding of the servo motor 5 exceeds the rated current $I_1$, the generated torque is expressed by a quadratic function in which the current is an independent variable. When the current flowing through the winding of the servo motor 5 is the maximum current $I_2$, the torque reaches the maximum torque $T_2$.

To make description concise, it is assumed that FIG. 2A illustrating the relation between the current and the torque is a two-dimensional xy-plane with the current and the torque as x and y, respectively, and the torque y is expressed by equation 1 where the rated current $I_1$ is a, the rated torque $T_1$ is b, the maximum current $I_2$ is c, and the maximum torque $T_2$ is d.

$$y = \begin{cases} \dfrac{b}{a}x & (0 \leq x \leq a) \\ \dfrac{b}{a}x - \dfrac{bc-ad}{a(c-a)^2}(x-a)^2 & (a < x \leq c) \end{cases} \quad (1)$$

As illustrated in the equation 1, in a range without magnetic saturation where x is at least zero and not more than a, the torque y is expressed by a linear function of x with a slope of "b/a", and in a range with magnetic saturation where x is more than a and not more than c, the torque y is expressed by a quadratic function with a slope of "b/a" where the slope of the tangent line at a point (a, b) is "b/a" and passes a point (c, d).

When the equation 1 is differentiated with respect to the current x, a torque constant y' as illustrated in equation 2 is obtained.

$$y' = \begin{cases} \dfrac{b}{a} & (0 \leq x \leq a) \\ \dfrac{b}{a} - \dfrac{2(bc-ad)}{a(c-a)^2}(x-a) & (a < x \leq c) \end{cases} \quad (2)$$

As illustrated in the equation 2, in a range without magnetic saturation where x is at least zero and not more than a, the torque constant y' is expressed by a constant "b/a", and in a range with magnetic saturation where x is more than a and not more than c, the constant y' is expressed by a linear function of x. In other words, it is understood that the actual torque constant in a magnetic saturation state decreases in a linear fashion as compared with the torque constant without considering magnetic saturation.

Therefore, in one embodiment, the torque constant correction unit 12 is configured so as to correct the torque constant stored in the storage unit 11, when magnetic saturation has occurred in the winding of the servo motor 5, in accordance with a linear function in which the value associated with the current of the servo motor 5 is an independent variable and the torque constant decreases as the value associated with the current of the servo motor 5 increases. In other words, the torque constant obtained by correction by the torque constant correction unit 12 when magnetic saturation occurs in the winding of the servo motor 5 decreases in accordance with a linear function in which the value associated with the current of the servo motor 5 is a variable.

The rated current $I_1$ (a in FIG. 2A and FIG. 2B), the rated torque $T_1$ (b in FIG. 2A and FIG. 2B), the maximum current $I_2$ (c in FIG. 2A and FIG. 2B), and the maximum torque $T_2$ (d in FIG. 2A and FIG. 2B) are commonly specified as specifications of the servo motor 5, and these parameters are easy to obtain since they are described, for example, in a specification table or an instruction manual of the servo motor 5. By plugging these parameters into the equation 2, both torque constants in a state without magnetic saturation and in a state with magnetic saturation can be calculated. The rated current $I_1$, the rated torque $T_1$, the maximum current $I_2$, and the maximum torque $T_2$ of the servo motor 5 may be stored in the storage unit 11 together with the torque constant predefined for the servo motor 5, and the torque constant correction unit 12 reads out the rated current $I_1$, the rated torque $T_1$, the maximum current $I_2$, the maximum torque $I_2$, and the torque constant of the servo motor 5 from the storage unit 11 and corrects the torque constant stored in the storage unit 11 in accordance with a linear function in which the value associated with the current of the servo motor 5 is an independent variable and the torque constant decreases as the value associated with the current of the servo motor 5 increases. A method of writing the rated current $I_1$, the rated torque $T_1$, the maximum current $I_2$, and the maximum torque $T_2$ of the servo motor 5 into the storage unit 11 itself does not limit the present embodiment, and the method of writing these parameters into the storage unit 11 has been available, for example, through an input operation by an operator by way of a numerical control apparatus (not illustrated) connected to the servo motor control apparatus 1.

Referring back to FIG. 1, the output calculation unit 13 calculates the output of the servo motor 5 on the basis of the torque constant stored in the storage unit 11 or the torque constant after correction calculated by the torque constant correction unit 12, the value associated with the current of the servo motor 5, and the value associated with the speed of the servo motor 5. More specifically, when the magnetic saturation determination unit 14 determines that magnetic saturation has occurred in the winding of the servo motor, the output calculation unit 13 calculates the output of the servo motor 5 on the basis of the torque constant after correction calculated by the torque constant correction unit 12, the value associated with the current of the servo motor 5, and the value associated with the speed of the servo motor 5. On the other hand, when the magnetic saturation determination unit 14 does not determine that magnetic saturation has occurred in the winding of the servo motor, the output calculation unit 13 calculates the output of the servo motor 5 on the basis of the torque constant stored in the storage unit 11, the value associated with the current of the servo motor 5, and the value associated with the speed of the servo motor 5. "The value associated with the speed of the servo motor 5" is either a rotor speed of the servo motor 5 detected by the speed detection unit 22 or a speed command for the servo motor 5 created by the speed command creation unit 32.

Next, forms of the output calculation unit 13 and the magnetic saturation determination unit 14 in the servo motor control apparatus 1 according to the one embodiment described above are described one by one. A servo motor control apparatus of a first form uses actual measured values with respect to each of the current and the speed while a servo motor control apparatus of a second form uses commands with respect to each of the current and the speed.

Figure 3:
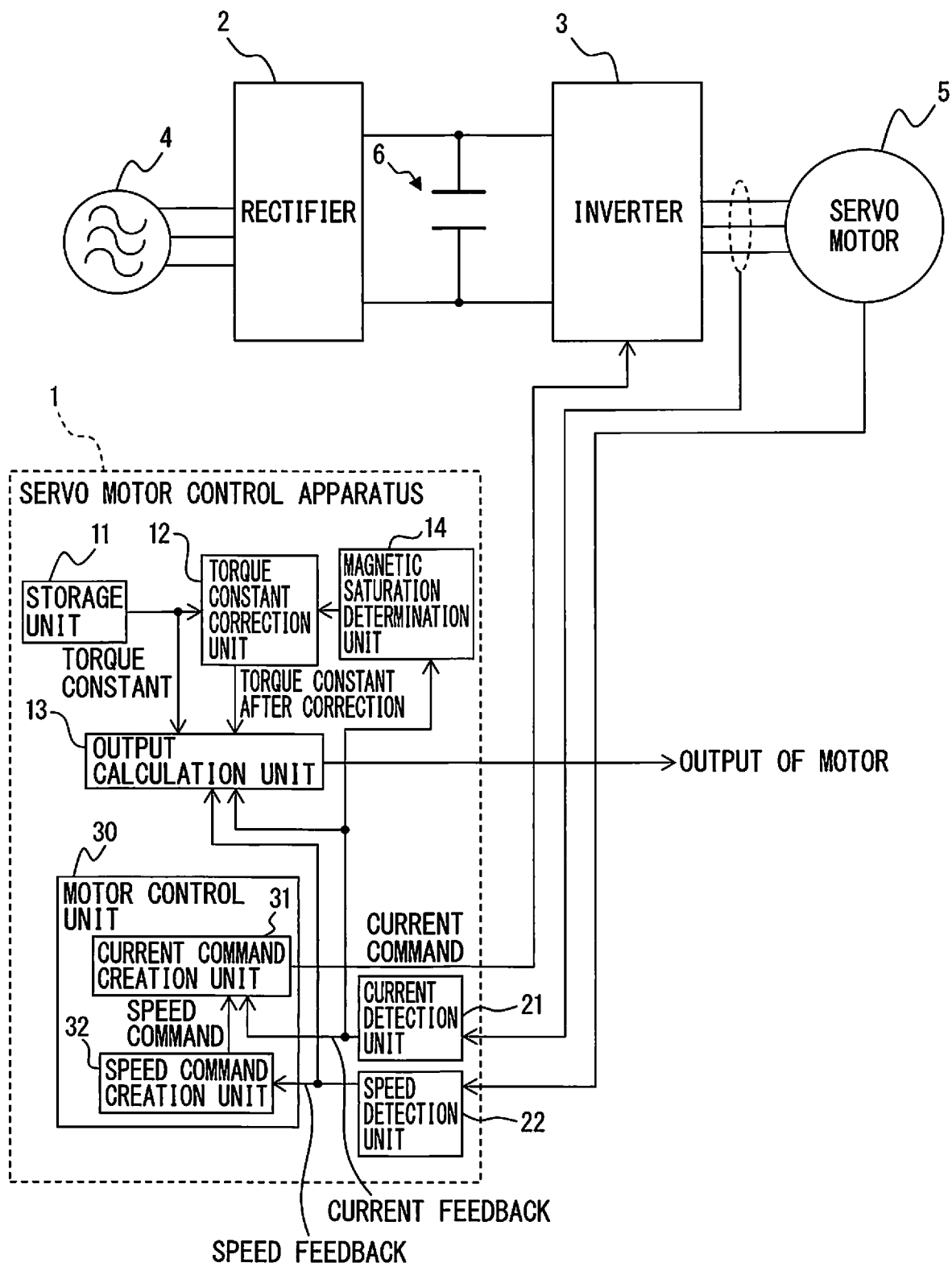
FIG. 3 is a block diagram of a servo motor control apparatus of a first form.

FIG. 3 is a block diagram of the servo motor control apparatus of the first form.

As illustrated in FIG. 3, the magnetic saturation determination unit 14 in the servo motor control apparatus 1 of the first form determines whether magnetic saturation has occurred in the winding of the servo motor 5 on the basis of a value of the current flowing through the winding of the servo motor 5 detected by the current detection unit 21. More specifically, the magnetic saturation determination unit 14 determines that magnetic saturation has occurred in the winding of the servo motor 5 when the value of the current flowing through the winding of the servo motor 5 detected by the current detection unit 21 exceeds a current threshold, and determines that magnetic saturation has not occurred in the winding of the servo motor 5 when the value of the current flowing through the winding of the servo motor 5 does not exceed the current threshold. The current threshold is set to the value of the rated current of the servo motor 5. Alternatively, the current threshold may be set to a value close to the rated current of the servo motor 5.

When the magnetic saturation determination unit 14 determines that magnetic saturation has occurred in the winding of the servo motor 5, the output calculation unit 13 in the servo motor control apparatus 1 of the first form calculates the output of the servo motor 5 on the basis of the torque constant after correction calculated by the torque constant correction unit 12, the value of the current flowing through the winding of the servo motor 5 detected by the current detection unit 21, and the rotor speed of the servo motor 5 detected by the speed detection unit 22. On the other hand, when the magnetic saturation determination unit 14 does not determine that magnetic saturation has occurred in the winding of the servo motor 5, the output calculation unit 13 in the servo motor control apparatus 1 of the first form calculates the output of the servo motor 5 on the basis of the torque constant stored in the storage unit 11, the value of the current flowing through the winding of the servo motor 5 detected by the current detection unit 21, and the rotor speed of the servo motor 5 detected by the speed detection unit 22. Assuming that the value of the current flowing through the winding of the servo motor 5 detected by the current detection unit 21 is i [A], the rotor speed (rotation speed) of the servo motor 5 detected by the speed detection unit 22 is ω [rad/min], the torque constant stored in the storage unit 11 is $K_T$ [Nm/A], and the torque constant after correction calculated by the torque constant correction unit 12 is $K_T'$ [Nm/A], the output calculation unit 13 in the servo motor control apparatus 1 of the first form calculates the output $P_1$ [W] of the servo motor 5 in accordance with equation 3.

$$P_1 = \begin{cases} \dfrac{2\pi \times K_T \times i \times w}{60} & \text{(Without magnetic saturation)} \\ \dfrac{2\pi \times K_T' \times i \times w}{60} & \text{(When magnetic saturation occurs)} \end{cases} \quad (3)$$

Figure 4:
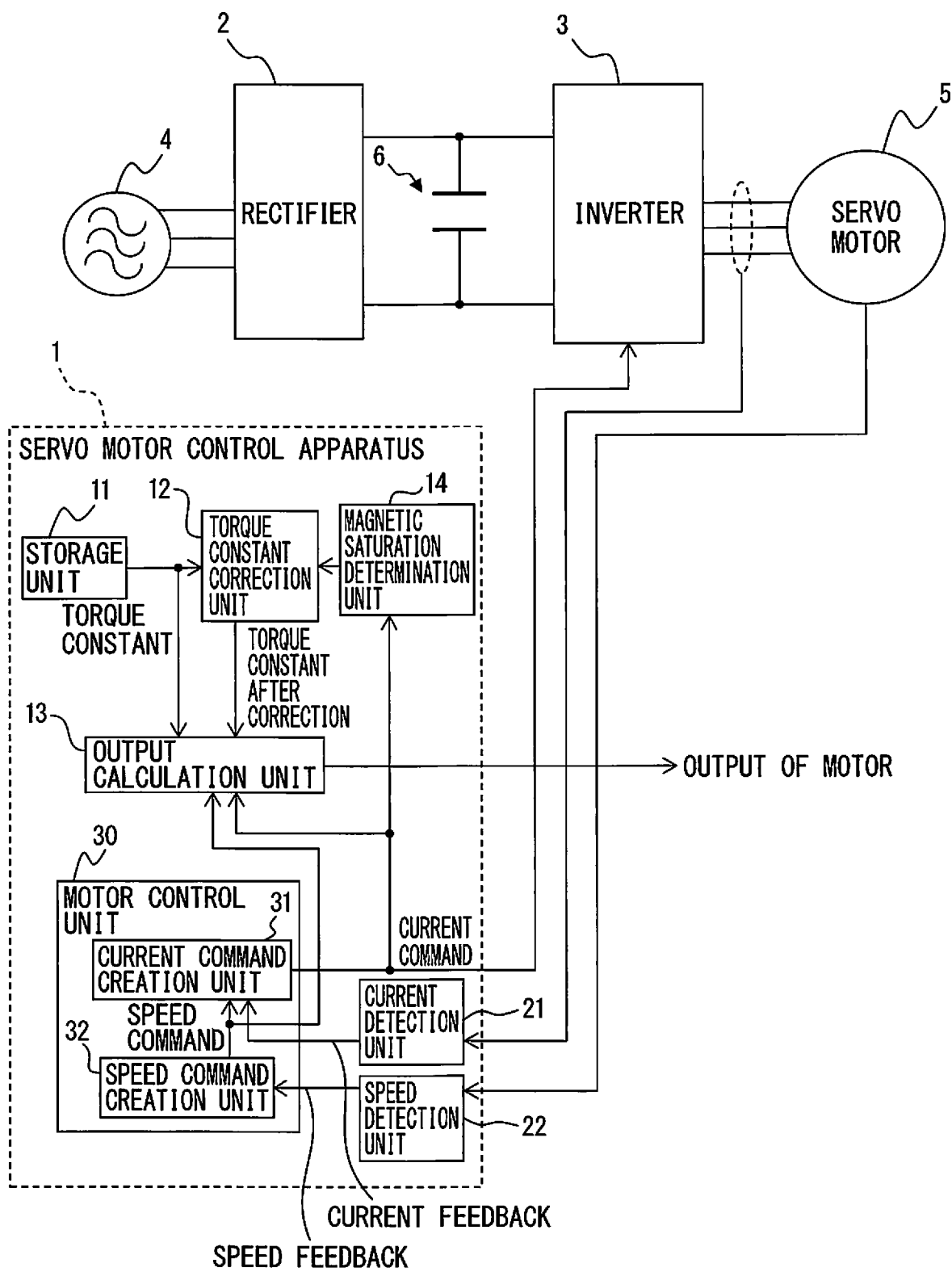
FIG. 4 is a block diagram of a servo motor control apparatus of a second form.

FIG. 4 is a block diagram of the servo motor control apparatus of the second form.

As illustrated in FIG. 4, the magnetic saturation determination unit 14 in the servo motor control apparatus 1 of the second form determines whether magnetic saturation has occurred in the winding of the servo motor 5 on the basis of the current command created by the current command creation unit 31. More specifically, the magnetic saturation determination unit 14 determines that magnetic saturation has occurred in the winding of the servo motor 5 when the current command created by the current command creation unit 31 exceeds the current threshold, and determines that magnetic saturation has not occurred in the winding of the servo motor 5 when the current command does not exceed the current threshold. The current threshold is set to the current command corresponding to the rated current of the servo motor 5. Alternatively, the current threshold may be set to a value of the current command corresponding to the rated current of the servo motor 5. Since the current detection unit 21 detects the value of the current that flows, in accordance with the current command created by the current command creation unit 31, through the winding of the servo motor 5, the current command created by the current command creation unit 31 temporally precedes the value of the current flowing through the winding of the servo motor 5 detected by the current detection unit 21; therefore, the servo motor control apparatus of the second form may detect occurrence of magnetic saturation in the winding of the servo motor 5 more quickly than the servo motor control apparatus of the first form.

When the magnetic saturation determination unit 14 determines that magnetic saturation has occurred in the winding of the servo motor, the output calculation unit 13 in the servo motor control apparatus 1 of the second form calculates the output of the servo motor 5 on the basis of the torque constant after correction calculated by the torque constant correction unit 12, the current command created by the current command creation unit 31, and the speed command for the servo motor 5 created by the speed command creation unit 32. On the other hand, when the magnetic saturation determination unit 14 does not determine that magnetic saturation has occurred in the winding of the servo motor, the output calculation unit 13 in the servo motor control apparatus 1 of the second form calculates the output of the servo motor 5 on the basis of the torque constant stored in the storage unit 11, the current command created by the current command creation unit 31, and the speed command for the servo motor 5 created by the speed command creation unit 32. Assuming that the current command created by the current command creation unit 31 is i*[A], the speed command for the servo motor 5 created by the speed command creation unit 32 is ω*[rad/min], the torque constant stored in the storage unit 11 is $K_T$ [Nm/A], and the torque constant after correction calculated by the torque constant correction unit 12 is $K_T'$ [Nm/A], the output calculation unit 13 in the servo motor control apparatus 1 of the second form calculates the output $P_2$ [W] of the servo motor 5 in accordance with equation 4.

$$P_2 = \begin{cases} \dfrac{2\pi \times K_T \times i^* \times w^*}{60} & \text{(Without magnetic saturation)} \\ \dfrac{2\pi \times K_T' \times i^* \times w^*}{60} & \text{(When magnetic saturation occurs)} \end{cases} \quad (4)$$

The output $P_2$ of the servo motor 5 obtained in accordance with the equation 4 indicates, in a manner, an output expected in the near future rather than the past. Therefore, using the output $P_2$ of the servo motor 5 obtained in accordance with the equation 4 in some kind of control has an advantage in that responsiveness of the control is improved.

Figure 5:
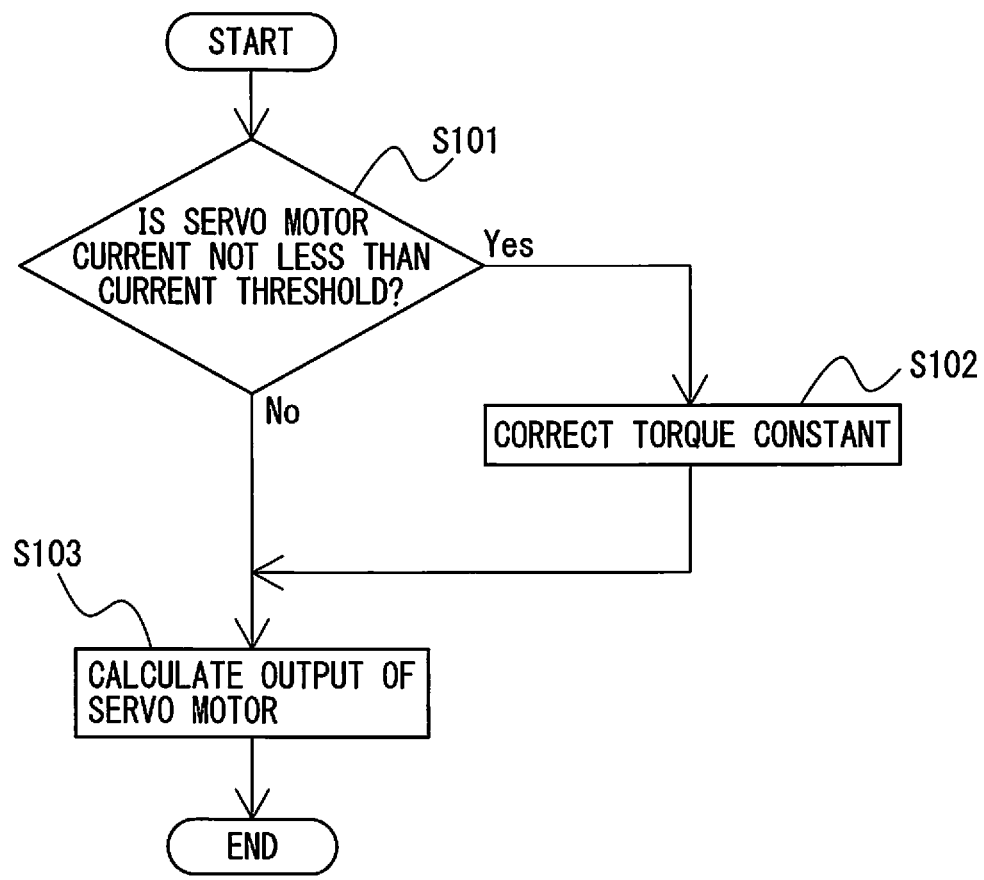
FIG. 5 is a flowchart illustrating an operation sequence of the servo motor control apparatus according to one embodiment.

FIG. 5 is a flowchart illustrating an operation sequence of the servo motor control apparatus according to one embodiment. The flowchart illustrated in FIG. 5 is applicable to both the servo motor control apparatus of the first form that uses actual measured values with respect to each of the current and the speed, which was described with reference to FIG. 3, and the servo motor control apparatus of the second form that uses commands with respect to each of the current and the speed, which was described with reference to FIG. 4.

In a state in which the servo motor control apparatus 1 controls driving of the servo motor 5, in step S101, the magnetic saturation determination unit 14 determines, to detect occurrence of magnetic saturation in the winding of the servo motor 5, whether the value associated with the current of the servo motor 5 exceeds the current threshold. When the magnetic saturation determination unit 14 determines that the value associated with the current of the servo motor 5 exceeds the current threshold, the process proceeds to step S102; otherwise, the process proceeds to step S103.

In step S102, the torque constant correction unit 12 corrects the torque constant stored in the storage unit 11 such that the torque constant decreases as the value associated with the current of the servo motor 5 increases. In this case, the torque constant after correction calculated by the torque constant correction unit 12 is expressed by a linear function in which, for example, the value associated with the current of the servo motor 5 is an independent variable and the torque constant decreases as the value associated with the current of the servo motor 5 increases. The torque constant after correction by the torque constant correction unit 12 is sent to the output calculation unit 13.

In step S103, the output calculation unit 13 calculates the output of the servo motor 5 on the basis of the torque constant stored in the storage unit 11 or the torque constant after correction calculated by the torque constant correction unit 12, the value associated with the current of the servo motor 5, and the value associated with the speed of the servo motor 5. More specifically, when the magnetic saturation determination unit 14 determines that magnetic saturation has occurred in the winding of the servo motor 5 in step S101, the output calculation unit 13 calculates the output of the servo motor 5 on the basis of the torque constant after correction calculated by the torque constant correction unit 12, the value associated with the current of the servo motor 5, and the value associated with the speed of the servo motor 5 in step S102. On the other hand, when the magnetic saturation determination unit 14 does not determine that magnetic saturation has occurred in the winding of the servo motor 5 in step S101, the output calculation unit 13 calculates the output of the servo motor 5 on the basis of the torque constant stored in the storage unit 11, the value associated with the current of the servo motor 5, and the value associated with the speed of the servo motor 5.

The torque constant correction unit 12, the output calculation unit 13, the magnetic saturation determination unit 14, and the motor control unit 30 (including the current command creation unit 31 and the speed command creation unit 32), described above, may be constructed, for example, in a software program form or a combination of a variety of electronic circuits and a software program. When these units are constructed, for example, in a software program form, functions of respective units are implemented by installing the software program on a DSP constituting the motor control unit 30 and operating an arithmetic processing unit in the DSP (not illustrated) in accordance with the software program. Alternatively, the torque constant correction unit 12, the output calculation unit 13, and the magnetic saturation determination unit 14 may be implemented as a semiconductor integrated circuit in which a software program for implementing the functions of the respective units; in this case, the functions of the respective units are implemented by mounting the semiconductor integrated circuit in an existing motor control unit.

The servo motor control apparatus 1 according to one embodiment described above may be used, for example, in a servo motor control system for controlling a drive axis servo motor that drives an axis of industrial machinery or a machine tool to control a flywheel servo motor for driving a flywheel provided as an electricity storage device for reducing a power peak for power supply equipment on the AC power supply side. The servo motor control system will be described below.

Figure 6:
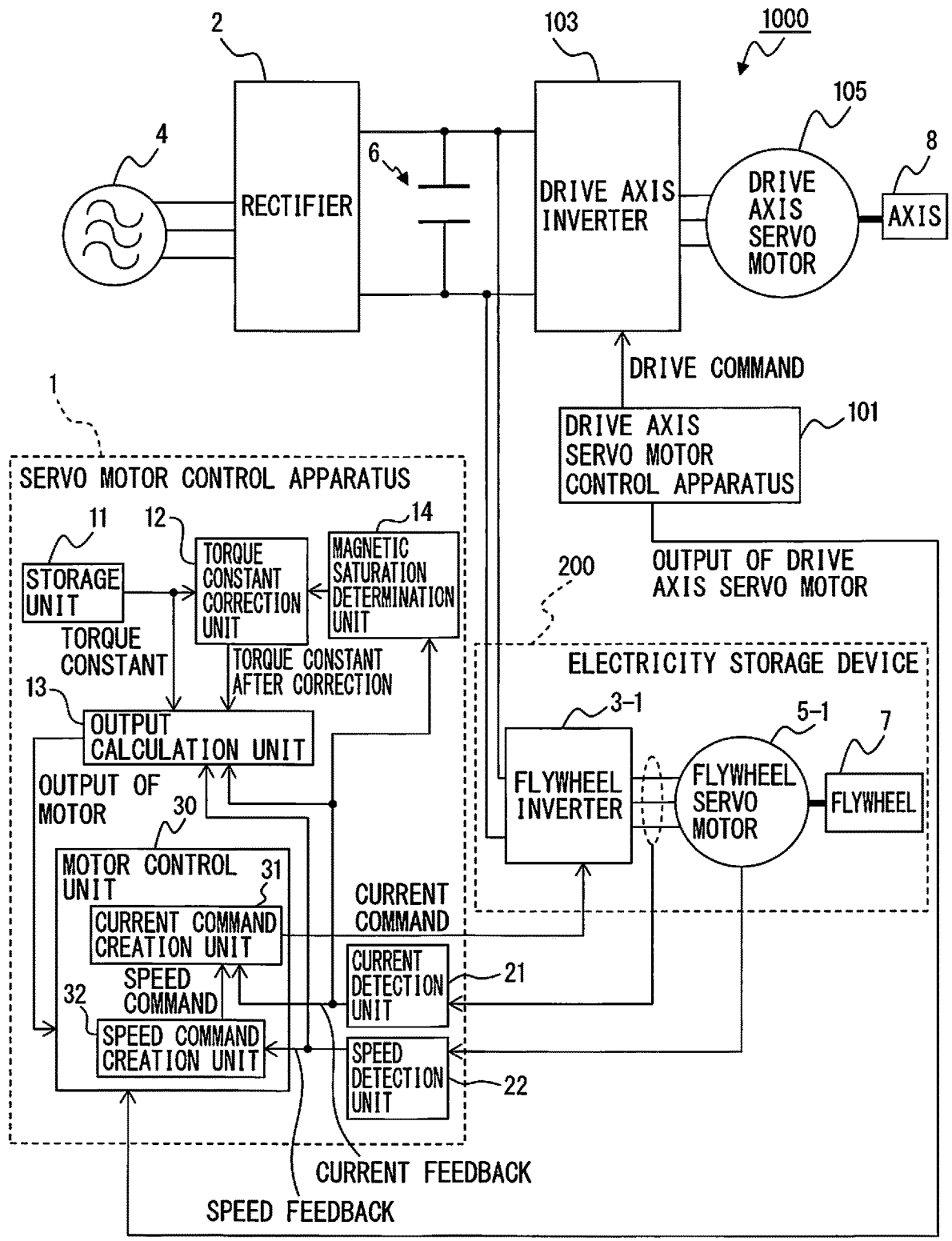
FIG. 6 is a block diagram of a servo motor control system including the servo motor control apparatus of the first form.
Figure 7:
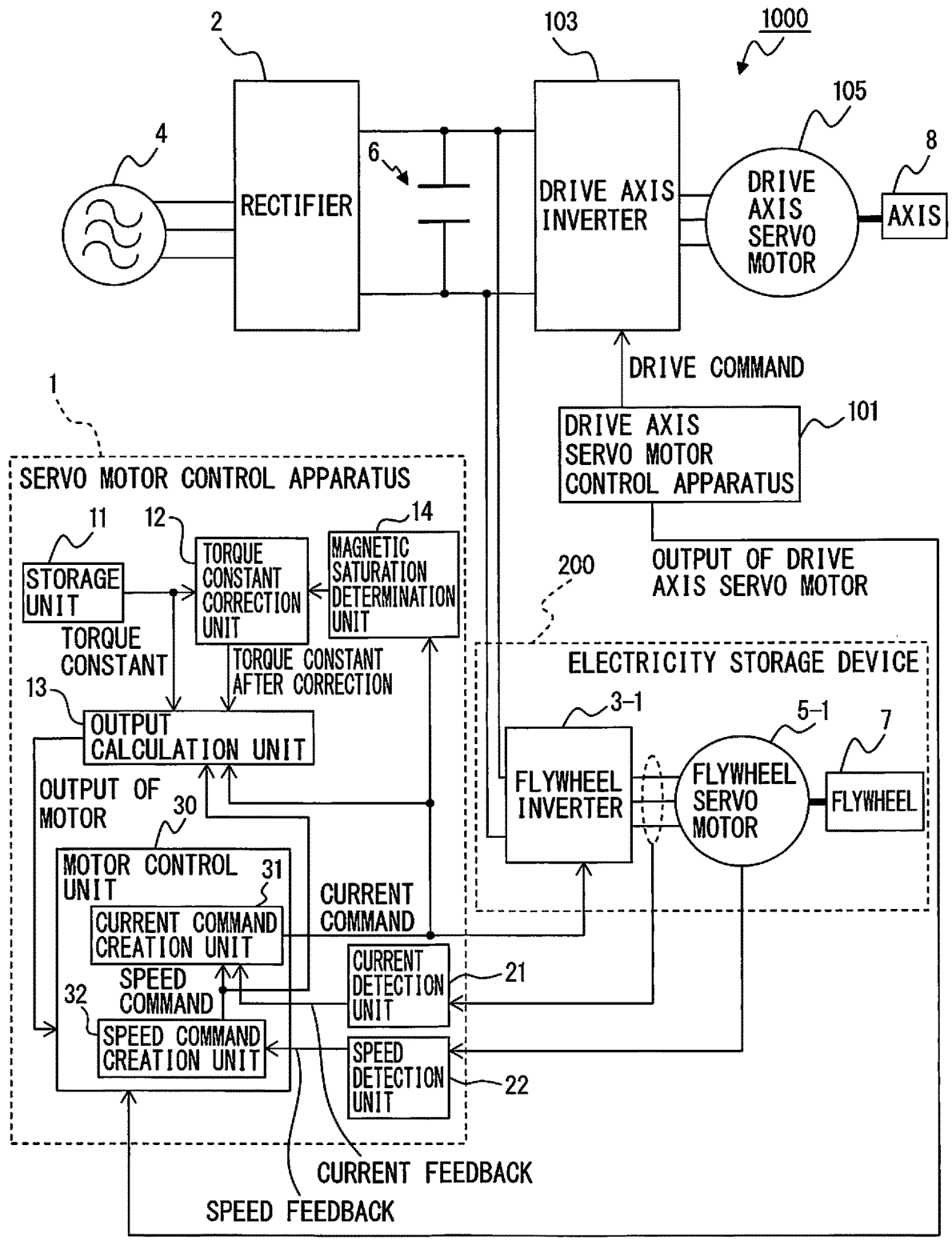
FIG. 7 is a block diagram of a servo motor control system including the servo motor control apparatus of the second form.

FIG. 6 is a block diagram of a servo motor control system including the servo motor control apparatus of the first form. As an example, the servo motor control apparatus 1 for controlling a flywheel servo motor 5-1 is implemented as the servo motor control apparatus of the first form described with reference to FIG. 3. An example in which the servo motor control apparatus 1 for controlling the flywheel servo motor 5-1 is implemented as the servo motor control apparatus of the second form described with reference to FIG. 4 is illustrated in FIG. 7 to be described later.

FIG. 6 illustrates a case in which a single axis 8 is driven by a drive axis servo motor 105 although the number of axes 8 does not limit the present embodiment and may be more than one. A type of the drive axis servo motor 105 that drives the axis 8 does not limit the present embodiment and may be, for example, an induction motor or a synchronous motor. The number of phases of the drive axis servo motor 105 does not particularly limit the present embodiment and may be, for example, a single phase or multi phases other than three phases.

The servo motor control system 1000 for controlling the drive axis servo motor 105 that drives the axis 8 of industrial machinery or a machine tool includes a rectifier 2, a drive axis inverter 103 serving as a first inverter, an electricity storage device 200, and the servo motor control apparatus 1. The electricity storage device 200 includes a flywheel 7, the flywheel servo motor 5-1, and a flywheel inverter 3-1 serving as a second inverter. Supply and storage of power by the electricity storage device 200 are controlled by the servo motor control apparatus 1, and the servo motor control apparatus 1 and the electricity storage device 200 constitute a flywheel electricity storage system.

The rectifier 2 converts AC power of the AC power supply 4 into DC power and outputs the DC power to the DC link.

Examples of the rectifier 2 include a diode rectifier circuit, a 120-degree conduction type rectifier circuit, or a PWM-controlled rectifier circuit including switching elements inside. When the rectifier 2 is a diode rectifier circuit, the rectifier 2 rectifies AC current supplied from the AC power supply 4 and outputs DC current to the DC link, which is on the DC side. When the rectifier 2 is a 120-degree conduction type rectifier circuit or a PWM-controlled rectifier circuit, the rectifier 2 may be implemented as an electric power converter that can perform conversion between AC power and DC power in both directions, for example, converting AC current supplied from the AC power supply 4 into DC power to output the DC power to the DC side as well as converting DC power supplied from the DC link into AC power to output the AC power to the AC power supply 4.

The DC link connecting the DC output side of the rectifier 2 and the DC input side of the drive axis inverter 103 is provided with a DC link capacitor 6. The DC link capacitor 6 has a function of accumulating DC power in the DC link as well as a function of suppressing a pulsating component of a DC output of the rectifier 2.

The drive axis inverter 103 serving as the first inverter is connected to the DC link and performs power conversion between the DC power in the DC link and AC power serving as drive power or regenerative power of the drive axis servo motor 105 as on-off control is performed for each switching element therein in accordance with the drive command supplied from a drive axis servo motor control apparatus 101. The drive axis inverter 103 is realized by a bridge circuit consisting of switching elements and diodes connected in antiparallel to the switching elements, and on-off control is performed for each switching element, for example, in accordance with the PWM control method. In the present embodiment, since the drive axis servo motor 105 is three-phase, the drive axis inverter 103 is configured as a three-phase bridge circuit. Examples of the switching elements include an IGBT, a thyristor, a GTO, and a transistor although the type of the switching elements itself does not limit the present embodiment and may be other types of switching elements. The drive axis inverter 103 causes the switching elements inside to perform a switching operation in accordance with the drive command received from the drive axis servo motor control apparatus 101 to convert the DC power in the DC link into AC power having a desired voltage and a desired frequency for driving the drive axis servo motor 105 (inversion operation). With this operation, the drive axis servo motor 105 operates in accordance with the supplied AC power having a variable voltage and a variable frequency. When regenerative power is generated during, for example, deceleration of the drive axis servo motor 105, the regenerative power of alternating current generated by the drive axis servo motor 105 is converted into DC power in accordance with the drive command received from the drive axis servo motor control apparatus 101 and returned to the DC link (conversion operation). In order to supply drive power to each drive axis servo motor 105 provided individually for each of a plurality of axes 8, the number of the drive axis inverters 103 provided is, for example, a number equal to the number of the drive axis servo motors 105, or for example, one for the plurality of drive axis servo motors 105, or for example, a number of drive axis inverters 103 several times as many as the number of windings of the drive axis servo motor 105 for one drive axis servo motor 105. In the illustrated example, since the number of the drive axis servo motors 105 is one to make the drawing concise, the number of the drive axis inverters 103 is one.

The electricity storage device 200 includes the flywheel 7, the flywheel servo motor 5-1, and the flywheel inverter 3-1 serving as the second inverter.

The flywheel 7 is capable of accumulating rotational energy and coupled to a rotation shaft of the flywheel servo motor 5-1.

The flywheel servo motor 5-1 includes the rotation shaft to which the flywheel 7 is coupled and is a servo motor with rotational inertia for rotating the flywheel 7. The number of phases of the flywheel servo motor 5-1 does not particularly limit the present embodiment and may be, for example, a single phase or multi phases other than three phases illustrated in FIG. 6.

As on-off control is performed for each switching element in accordance with the current command supplied from (the motor control unit 30 of) the servo motor control apparatus 1, the flywheel inverter 3-1 serving as the second inverter converts AC power regenerated by the flywheel servo motor 5-1 into DC power or converts DC power in the DC link into AC power for driving the flywheel servo motor 5-1 in accordance with the output of the drive axis servo motor 105 and the output of the flywheel servo motor 5-1 calculated by the output calculation unit 13 in the servo motor control apparatus 1. The flywheel inverter 3-1 is realized by a bridge circuit consisting of switching elements and diodes connected in antiparallel to the switching elements, and on-off control is performed for each switching element, for example, in accordance with the PWM control method. In the present embodiment, since the flywheel servo motor 5-1 is three-p phase, the flywheel inverter 3-1 is configured as a three-phase bridge circuit. Examples of the switching elements include an IGBT, a thyristor, a GTO, and a transistor although the type of the switching elements itself does not limit the present embodiment and may be other types of switching elements.

The configuration of the servo motor control apparatus 1 serving as the servo motor control apparatus of the first form is as described with reference to FIG. 3. Supply and storage of power by the electricity storage device 200 are controlled by the servo motor control apparatus 1. In other words, the servo motor control apparatus 1 causes the electricity storage device 200 to supply power to the DC link by controlling the flywheel inverter 3-1 to convert AC power regenerated by the flywheel servo motor 5-1 into DC power, and recovers a portion of the power in the DC link to store the portion in the electricity storage device 200 by controlling the flywheel inverter 3-1 to convert the DC power in the DC link into AC power for driving the flywheel servo motor 5-1.

An amount of power to be supplied and stored by the electricity storage device 200 is determined on the basis of the output of the drive axis servo motor 105, the output of the flywheel servo motor 5-1 calculated by the output calculation unit 13 in the servo motor control apparatus 1, a capacity of the power supply equipment of the AC power supply 4, the power conversion performance of the rectifier 2, the power conversion performance of the flywheel inverter 3-1, the power conversion performance of the drive axis inverter 103, and the like. Specifically, it is determined as follows.

Since the drive axis servo motor 105 consumes high power upon acceleration of the drive axis servo motor 105, output of high AC power is preferably performed by the power supply equipment of the AC power supply 4. In this case, the motor control unit 30 of the servo motor control apparatus 1 controls power conversion by the flywheel inverter 3-1 such that "DC power obtained by converting, by the flywheel inverter 3-1, AC power regenerated by the flywheel servo motor 5-1" compensates for a portion insufficient for the DC power in the DC link required for conversion into AC power that is supplied by the drive axis inverter 103 as the drive power of the drive axis servo motor 105 only with "DC power obtained by converting the AC power of the AC power supply 4 by the rectifier 2." "The DC power in the DC link required for conversion into AC power that is supplied by the drive axis inverter 103 as drive power of the drive axis servo motor 105" is determined by information relating to the output of the drive axis servo motor 105 received from the drive axis servo motor control apparatus 101. "The DC power obtained by converting the AC power of the AC power supply 4 by the rectifier 2" is determined by the capacity of the power supply equipment of the AC power supply 4 and the power conversion performance of the rectifier 2. When a difference in electric power obtained by subtracting "the DC power obtained by converting the AC power of the AC power supply 4 by the rectifier 2" from "the DC power in the DC link required for conversion into AC power that is supplied by the drive axis inverter 103 as drive power of the drive axis servo motor 105" is positive, it indicates that "the DC power obtained by converting the AC power of the AC power supply 4 by the rectifier 2" alone may not cover "the DC power in the DC link required for conversion into AC power that is supplied by the drive axis inverter 103 as drive power of the drive axis servo motor 105" and is insufficient. In such a case, the DC power obtained by converting, by the flywheel inverter 3-1, AC power regenerated by the flywheel servo motor 5-1 therefore compensates for the shortfall. With this operation, during acceleration of the drive axis servo motor 105, energy supplied from the electricity storage device 200 to the DC link is used in addition to the energy from the AC power supply 4, and it is possible to reduce the power peak for the power supply equipment on the AC power supply side.

The amount of power supplied by and stored in the electricity storage device 200 described above is directly associated with the output of the flywheel servo motor 5-1, therefore, calculating the output of the flywheel servo motor 5-1 accurately is important when controlling the power to be supplied by and stored in the electricity storage device 200. Calculation of the output of the flywheel servo motor 5-1 by the output calculation unit 13 in the servo motor control apparatus 1 is performed as described with reference to FIG. 3. In other words, when the magnetic saturation determination unit 14 determines that magnetic saturation has occurred in the winding of the flywheel servo motor 5-1, the output calculation unit 13 calculates the output of the flywheel servo motor 5-1 on the basis of the torque constant after correction calculated by the torque constant correction unit 12, the value of the current flowing through the winding of the flywheel servo motor 5-1 detected by the current detection unit 21, and the rotor speed of the flywheel servo motor 5-1 detected by the speed detection unit 22. On the other hand, when the magnetic saturation determination unit 14 does not determine that magnetic saturation has occurred in the winding of the flywheel servo motor 5-1, the output calculation unit 13 calculates the output of the flywheel servo motor 5-1 on the basis of the torque constant stored in the storage unit 11, the value of the current flowing through the winding of the flywheel servo motor 5-1 detected by the current detection unit 21, and the rotor speed of the flywheel servo motor 5-1 detected by the speed detection unit 22. In this manner, the torque constant predefined for the flywheel servo motor 5-1 is corrected and the output of the flywheel servo motor 5-1 is calculated using the torque constant after correction when magnetic saturation has occurred in the winding of the flywheel servo motor 5-1 while the output of the flywheel servo motor 5-1 is calculated using the torque constant predefined for the flywheel servo motor 5-1 when magnetic saturation has not occurred in the winding of the flywheel servo motor 5-1; thus, the output of the flywheel servo motor 5-1 may be calculated with high degree of precision. By using the highly precise calculation result with respect to the output of the flywheel servo motor 5-1, the amount of power supplied from and stored in the electricity storage device 200 may be controlled with high degree of precision.

The output of the drive axis servo motor 105 may be calculated as an amount of power on the basis of a current flowing through the winding of the drive axis servo motor 105 and a voltage applied to an input terminal of the drive axis servo motor 105. In addition, the drive axis servo motor control apparatus 101 may be implemented as the servo motor control apparatus of the first form described with reference to FIG. 3, and calculation of the output of the drive axis servo motor 105 may be performed while controlling the drive axis servo motor 105. In this case, the magnetic saturation determination unit 14 in the servo motor control apparatus 1 for the drive axis determines whether magnetic saturation has occurred in the winding of the drive axis servo motor 105, the torque constant correction unit 12 in the servo motor control apparatus 1 for the drive axis corrects the torque constant predefined for the drive axis servo motor 105 when magnetic saturation has occurred, the output calculation unit 13 in the servo motor control apparatus 1 for the drive axis calculates the output of the drive axis servo motor 105, and the motor control unit 30 in the servo motor control apparatus 1 for the drive axis controls power conversion by the drive axis inverter 103.

With respect to the servo motor control system 1000 illustrated in FIG. 6, the servo motor control apparatus 1 for controlling the flywheel servo motor 5-1 is implemented as the servo motor control apparatus of the first form described with reference to FIG. 3 as an example; however, the servo motor control apparatus 1 may be instead implemented as the servo motor control apparatus of the second form described with reference to FIG. 4. This will be described below with reference to FIG. 7.

FIG. 7 is a block diagram of a servo motor control system including the servo motor control apparatus of the second form. The servo motor control apparatus of the second form uses commands with respect to each of the current and the speed. Therefore, by changing the signals input into the output calculation unit 13 and the magnetic saturation determination unit 14 in the servo motor control apparatus 1 in the embodiment described with reference to FIG. 6 from the signals from the current detection unit 21 and the speed detection unit 22, which was described with reference to FIG. 3, to signals from the current command creation unit 31 and the speed command creation unit 32, which was described with reference to FIG. 4, the servo motor control system 1000 illustrated in FIG. 7 including the servo motor control apparatus of the second form may be realized. Components other than these are similar to the components illustrated in FIG. 4 and FIG. 6. In the servo motor control system 1000 illustrated in FIG. 7, the current command created by the current command creation unit 31 temporally precedes the value of the current flowing through the winding of the flywheel servo motor 5-1 detected by the current detection unit 21; therefore, the servo motor control system 1000 illustrated in FIG. 7 may detect occurrence of magnetic saturation in the winding of the flywheel servo motor 5-1 more quickly. In other words, the flywheel servo motor 5-1 in the servo motor control system 1000 including the servo motor control apparatus of the second form illustrated in FIG. 7 is more responsive than that in the servo motor control system 1000 including the servo motor control apparatus of the first form illustrated in FIG. 6.

Figure 8:
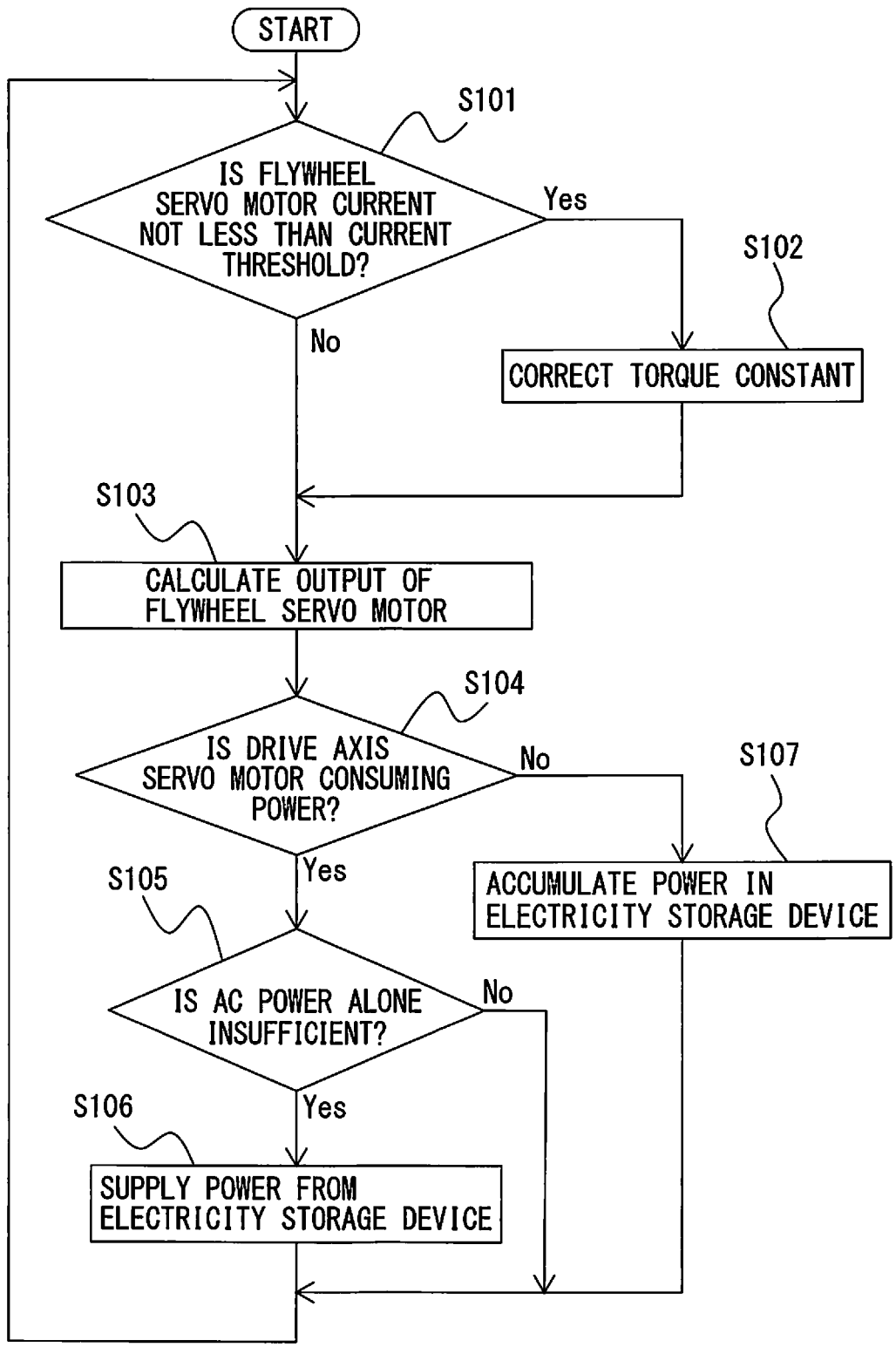
FIG. 8 is a flowchart illustrating an operation sequence of a servo motor control system including the servo motor control apparatus according to one embodiment.

FIG. 8 is a flowchart illustrating an operation sequence of the servo motor control system including the servo motor control apparatus according to one embodiment. The flowchart illustrated in FIG. 8 is applicable to both the servo motor control system 1000 including the servo motor control apparatus of the first form described with reference to FIG. 6 and the servo motor control system 1000 including the servo motor control apparatus of the second form described with reference to FIG. 7.

In a state in which the drive axis servo motor control apparatus 101 controls driving of the drive axis servo motor 105, in step S101, the magnetic saturation determination unit 14 determines, to detect occurrence of magnetic saturation in the winding of the flywheel servo motor 5-1, whether the value associated with the current of the flywheel servo motor 5-1 exceeds the current threshold. When the magnetic saturation determination unit 14 determines that the value associated with the current of the flywheel servo motor 5-1 exceeds the current threshold in step S101, the process proceeds to step S102; otherwise, the process proceeds to step S103.

In step S102, the torque constant correction unit 12 corrects the torque constant stored in the storage unit 11 such that the torque constant decreases as the value associated with the current of the flywheel servo motor 5-1 increases. In this case, the torque constant after correction calculated by the torque constant correction unit 12 is expressed by a linear function in which, for example, the value associated with the current of the flywheel servo motor 5-1 is an independent variable and the torque constant decreases as the value associated with the current of the flywheel servo motor 5-1 increases. The torque constant after correction by the torque constant correction unit 12 is sent to the output calculation unit 13.

In step S103, the output calculation unit 13 calculates the output of the flywheel servo motor 5-1 on the basis of the torque constant stored in the storage unit 11 or the torque constant after correction calculated by the torque constant correction unit 12, the value associated with the current of the flywheel servo motor 5-1, and the value associated with the speed of the flywheel servo motor 5-1. More specifically, when the magnetic saturation determination unit 14 determines that magnetic saturation has occurred in the winding of the flywheel servo motor 5-1 in step S101, the output calculation unit 13 calculates the output of the flywheel servo motor 5-1 on the basis of the torque constant after correction calculated by the torque constant correction unit 12 in step S102, the value associated with the current of the flywheel servo motor 5-1, and the value associated with the speed of the flywheel servo motor 5-1. On the other hand, when the magnetic saturation determination unit 14 does not determine that magnetic saturation has occurred in the winding of the flywheel servo motor 5-1 in step S101, the output calculation unit 13 calculates the output of the flywheel servo motor 5-1 on the basis of the torque constant stored in the storage unit 11, the value associated with the current of the flywheel servo motor 5-1, and the value associated with the speed of the flywheel servo motor 5-1.

In step S104, the drive axis servo motor control apparatus 101 determines whether the drive axis servo motor 105 is consuming power. The determination result is sent to the motor control unit 30 in the servo motor control apparatus 1 that controls the flywheel servo motor 5-1. The output of the drive axis servo motor 105 may be calculated as an amount of power on the basis of the current flowing through the winding of the drive axis servo motor 105 and the voltage applied to the input terminal of the drive axis servo motor 105. In addition, the drive axis servo motor control apparatus 101 may be implemented as the servo motor control apparatus of the first form described with reference to FIG. 3, and calculation of the output of the drive axis servo motor 105 may be performed. When it is determined that the drive axis servo motor 105 is consuming power in step S104, the process proceeds to step S105; otherwise, the process proceeds to step S107.

When it is determined that the drive axis servo motor 105 is not consuming power in step S104, the drive axis servo motor 105 is decelerating and in a state of regenerating AC power, and the AC power is accumulated in the electricity storage device 200 in step S107. More specifically, the drive axis servo motor control apparatus 101 controls the drive axis inverter 103 to convert the regenerative power of alternating current generated by the drive axis servo motor 105 into DC power and return the DC power to the DC link (conversion operation) while the servo motor control apparatus 1 controls the flywheel inverter 3-1 to perform an inversion operation in which the DC power in the DC link is converted into AC power; thus, the energy in the DC link flows into the flywheel servo motor 5-1 to allow the flywheel servo motor 5-1 to rotate. With this operation, the electric energy having flowed in will be accumulated in a form of rotational energy of the flywheel 7 (step S107).

When it is determined, in step S104, that the drive axis servo motor 105 is consuming power, the motor control unit 30 in the servo motor control apparatus 1 determines, in step S105, whether "the DC power obtained by converting the AC power of the AC power supply 4 by the rectifier 2" alone is insufficient for "the DC power in the DC link required for conversion into AC power that is supplied by the drive axis inverter 103 as drive power of the drive axis servo motor 105." More specifically, the motor control unit 30 calculates a difference by subtracting "the DC power obtained by converting the AC power of the AC power supply 4 by the rectifier 2" from "the DC power in the DC link required for conversion into AC power that is supplied by the drive axis inverter 103 as drive power of the drive axis servo motor 105" and; when the difference in electric power is positive, the motor control unit 30 determines that the DC power obtained by converting the AC power of the AC power supply 4 by the rectifier 2 alone is not enough (insufficient) for driving the drive axis servo motor 105." When it is determined that power is insufficient for driving the drive axis servo motor 105, the process proceeds to step S106; otherwise, the process returns to step S101.

In step S106, the servo motor control apparatus 1 controls the flywheel inverter 3-1 to perform a conversion operation in which the AC power regenerated by reducing the speed of the flywheel servo motor 5-1 is converted into DC power. With this operation, the rotational energy stored in the flywheel 7 is converted into electric energy by way of the flywheel servo motor 5-1 and the flywheel inverter 3-1, and supplied to the DC link (S106). By including such configuration, when the drive axis servo motor 105 is consuming power (during acceleration of the drive axis servo motor 105), the energy supplied from the electricity storage device 200 to the DC link can be used in addition to energy from the AC power supply 4, and the power peak for the power supply equipment on the AC power supply side may be reduced. After this step, the process returns to step S101 and processes in steps S101 to S107 are repeatedly executed.

Thus, when a flywheel electricity storage system for reducing a power peak for power supply equipment on the AC power supply side is provided in a servo motor control system for controlling a drive axis servo motor that drives an axis of industrial machinery or a machine tool, a highly precise calculation result with respect to the output of the flywheel servo motor is used; therefore, the amount of power supplied from and stored in the electricity storage device may be controlled with high degree of precision.

According to one aspect of the present disclosure, when magnetic saturation has occurred in a winding of a servo motor, a torque constant predefined for the servo motor is corrected and an output of the servo motor is calculated on the basis of the torque constant after correction, a value associated with a current of the servo motor, and a value associated with a speed of the servo motor; on the other hand, when magnetic saturation has not occurred in the winding of the servo motor, the output of the servo motor is calculated on the basis of the torque constant predefined for the servo motor, the value associated with the current of the servo motor, and the value associated with the speed of the servo motor; thus, the output of the servo motor may be calculated with high degree of precision.

The invention claimed is:

1. A servo motor control apparatus for controlling a servo motor, comprising:
   a memory configured to store a torque constant predefined for the servo motor;
   a controller configured to
      correct the torque constant stored in the memory when magnetic saturation has occurred in a winding of the servo motor; and
      calculate an output of the servo motor based on
         (a-1) the torque constant stored in the memory or
         (a-2) the torque constant after correction calculated by the controller,
         (b) a value associated with a current of the servo motor, and
         (c) a value associated with a speed of the servo motor,
   wherein the controller is configured to correct the torque constant stored in the memory when magnetic saturation has occurred in the winding of the servo motor such that the torque constant decreases as the value associated with the current of the servo motor increases.

2. The servo motor control apparatus according to claim 1, wherein
   the controller is further configured to:
      determine whether magnetic saturation has occurred in the winding of the servo motor, and
      in response to a determination that magnetic saturation has occurred in the winding of the servo motor, correct the torque constant stored in the memory, and calculate the output of the servo motor based on
         (a-2) the torque constant after the calculated correction,
         (b) the value associated with the current of the servo motor, and
         (c) the value associated with the speed of the servo motor.

3. The servo motor control apparatus according to claim 2, wherein when the value associated with the current of the servo motor exceeds a predetermined current threshold, the controller is configured to determine that magnetic saturation has occurred in the winding of the servo motor.

4. The servo motor control apparatus according to claim 1, wherein the torque constant after the calculated correction is expressed by a linear function in which the value associated with the current of the servo motor is an independent variable and the torque constant decreases as the value associated with the current of the servo motor increases.

5. The servo motor control apparatus according to claim 1, further comprising:
a current detector configured to detect a value of the current flowing through the winding of the servo motor,
wherein the value associated with the current of the servo motor is the value of the current flowing through the winding of the servo motor detected by the current detector.

6. The servo motor control apparatus according to claim 1, wherein
the controller is further configured to create a current command for flowing current in the winding of the servo motor, and
the value associated with the current of the servo motor is the created current command.

7. The servo motor control apparatus according to claim 1, further comprising:
a speed detector configured to detect a rotor speed of the servo motor,
wherein the value associated with the speed of the servo motor is the rotor speed of the servo motor detected by the speed detector.

8. The servo motor control apparatus according to claim 1, wherein
the controller is further configured to create a speed command for the servo motor, and
the value associated with the speed of the servo motor is a value of the created speed command for the servo motor.

9. A servo motor control system for controlling a drive axis servo motor that drives an axis of industrial machinery or a machine tool, comprising:
a rectifier configured to convert AC power of an AC power supply into DC power and output the DC power to a DC link;
a first inverter connected to the DC link and configured to perform power conversion between the DC power in the DC link and AC power serving as drive power or regenerative power of the drive axis servo motor;
a flywheel;
a flywheel servo motor connected to the flywheel and configured to rotate the flywheel;
a second inverter connected with the DC link and configured to perform power conversion between the DC power in the DC link and AC power serving as drive power or regenerative power of the flywheel servo motor; and
the servo motor control apparatus according to claim 1, configured to control the flywheel servo motor,
wherein the power conversion by the second inverter is controlled such that the AC power regenerated by the flywheel servo motor is converted into DC power or the DC power in the DC link is converted into AC power for driving the flywheel servo motor in accordance with an output of the drive axis servo motor and an output of the flywheel servo motor calculated by the controller.

10. A servo motor control system for controlling a drive axis servo motor that drives an axis of industrial machinery or a machine tool, comprising:
a rectifier configured to convert AC power of an AC power supply into DC power and output the DC power to a DC link;
a first inverter connected to the DC link and configured to perform power conversion between the DC power in the DC link and AC power serving as drive power or regenerative power of a drive axis servo motor;
a flywheel;
a flywheel servo motor connected with the flywheel and configured to rotate the flywheel;
a second inverter connected to the DC link and configured to perform power conversion between the DC power in the DC link and AC power serving as drive power or regenerative power of the flywheel servo motor; and
at least two of the servo motor control apparatuses according to claim 1, configured to control each of the drive axis servo motor and the flywheel servo motor,
wherein the power conversion by the second inverter is controlled such that the AC power regenerated by the flywheel servo motor is converted into DC power or the DC power in the DC link is converted into AC power for driving the flywheel servo motor in accordance with an output of the drive axis servo motor and an output of the flywheel servo motor, both of which are calculated by the controller.

11. The servo motor control system according to claim 9, wherein the power conversion by the second inverter is controlled such that DC power obtained by converting, by the second inverter, AC power regenerated by the flywheel servo motor compensates for a portion insufficient for the DC power in the DC link required for conversion into AC power that is supplied by the first inverter as the drive power of the drive axis servo motor only with DC power obtained by converting the AC power of the AC power supply by the rectifier.

12. A servo motor control apparatus for controlling a servo motor, comprising:
a memory configured to store a torque constant predefined for the servo motor;
a torque constant correction unit configured to correct the torque constant stored in the memory when magnetic saturation has occurred in a winding of the servo motor;
a controller configured to calculate an output of the servo motor based on
(a-1) the torque constant stored in the memory or (a-2) the torque constant after correction calculated by the controller,
(b) a value associated with a current of the servo motor, and
(c) a value associated with a speed of the servo motor;
wherein
the controller is further configured to determine whether magnetic saturation has occurred in the winding of the servo motor, and
when the controller determines that magnetic saturation has occurred in the winding of the servo motor, the controller corrects the torque constant stored in the memory, the controller calculates an output of the servo motor based on the torque constant after correction calculated by the controller, the value associated with the current of the servo motor, and the value associated with the speed of the servo motor;
when the value associated with the current of the servo motor exceeds a predetermined current threshold, the controller determines that magnetic saturation has occurred in the winding of the servo motor, and
the current threshold is set to a value corresponding to a rated current of the servo motor or a value corresponding to a value close to the rated current.

* * * * *